United States Patent [19]

Gammel et al.

[11] 4,197,501

[45] Apr. 8, 1980

[54] SYSTEM FOR RECEPTION OF FREQUENCY MODULATED DIGITAL COMMUNICATION SIGNALS

[75] Inventors: Josef Gammel, Munich; Karl Kammerlander, Wolfratshausen; Hans-Juergen von der Neven, Munich, all of Fed. Rep. of Germany

[73] Assignee: Siemens Aktiengesellschaft, Berlin & Munich, Fed. Rep. of Germany

[21] Appl. No.: 810,904

[22] Filed: Jun. 28, 1977

[30] Foreign Application Priority Data

Jun. 28, 1976 [DE] Fed. Rep. of Germany ....... 2628997

[51] Int. Cl.² .................. H04L 27/14; H04B 1/10
[52] U.S. Cl. ................................ 375/88; 178/118; 455/303
[58] Field of Search .............. 325/472, 474, 480, 315, 325/316, 302, 303, 304, 306, 320, 473; 178/88

[56] References Cited

U.S. PATENT DOCUMENTS

| | | | |
|---|---|---|---|
| 3,711,777 | 1/1973 | Tink | 325/320 |
| 3,728,634 | 4/1973 | Watkinson | 325/316 |
| 3,895,187 | 7/1975 | Antoszewski | 325/320 |

*Primary Examiner*—Marc E. Bookbinder
*Attorney, Agent, or Firm*—Hill, Van Santen, Steadman, Chiara & Simpson

[57] ABSTRACT

A system for the reception of digital communication signals which are impressed in the form of a frequency modulation upon a carrier such that they are reflection free and can be used particularly for mobile stations, long distance traffic and scatter beam connections.

8 Claims, 30 Drawing Figures

SYSTEM FOR RECEPTION OF FREQUENCY MODULATED DIGITAL COMMUNICATION SIGNALS

BACKGROUND OF THE INVENTION

1. Field of the Invention

This invention relates in general to electrical communication systems and in particular to a novel digital communication system.

2. Description of the Prior Art

In digital communication transmission systems where heavily disturbed propagation conditions exist such as multipath propagation, the range is approximately inversely proportional to the magnitude of the bit rate to be transmitted. The critical situation which determines the range is represented by the total information destruction which as a result of the difference in transit times produced by the direct wave and the reflected carrier waves cause the signals to arrive in phase opposition at the receiver and mutually cancel one another. In a wide range preceeding this critical condition, partial information losses occur due to distortions of transit time and amplitude which give rise to very high error rates in the transmission media.

SUMMARY OF THE INVENTION

It is an object of the present invention to correct and provide an improved transmission system where direct and multipath distortion occurs so as to provide an improvement in the range of digital communication systems using frequency modulation in particular between mobile stations and under constantly changing propagation conditions.

The present invention utilizes a system for the reception of digital communication signals which are impressed in the form of frequency modulation on a carrier in a reflective propagation medium for use in particular with mobile stations, long distance traffic and scatter beam connections and the invention provides that normal information losses which occur by phase and amplitude distortions are automatically detected depending upon their origin in two supplementary arrangements, one of which consists of a frequency discriminator which is followed by a device for the recognition of interference peaks caused by reflection distortions and a circuit which compensates said interference peaks. In addition, an amplitude demodulator is connected in parallel with the frequency demodulator in another branch and the outputs of the two demodulators are supplied to a change-over switch which is controlled by an amplitude modulation analyzing device and which with detection of an amplitude modulation of a sufficient value switches the amplitude demodulator and with detectable frequency modulation switches the frequency discriminator and interference peak detector in each case to a common output. Furthermore, the output of the AM demodulator is followed by a polarization inverter which is controlled by a polarization integrator and reverses the AM demodulation product depending upon the magnitude of the FM demodulation product to produce a polarity correct AM demodulation signal.

The receiving system results in considerable improvement in the transmission quality and range of digitalized communication systems utilizing binary frequency modulation.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure and in which:

DESCRIPTION OF THE PREFERRED EMBODIMENTS

Nearly all radio communication systems depending upon the topograhic features are subject to multipath wave propagation which in particular when mobile transmission of digital frequency modulation data occurs particularly utilizing omnidirectional antennae causes serious reception disturbances under certain circumstances. This is because the wave fronts emitted from the transmitting antenna arrive at the receiving antenna with different transit times between the direct and the reflected waves which may come from different directions. As a result of the vectorial addition of these wave fronts at the reception point, the antenna base voltage is subject to amplitude and phase response which is dependent both upon the frequency and location and maxima and minima occur. Due to the distortions and energy reductions which these cause, the energy distribution results in a loss of signal which prevents reading out the digital information for many frequencies and locations.

When considering a fundamental explanation of distortions caused by multipath propagation, it is expedient to first fix the geographic positions of the transmitter and receiver. This allows the location-dependent energy distribution to be disregarded and merely the frequency-dependent energy distribution remains.

As soon as the transit time differences of the wave fronts arriving at the reception location of the direct beam $U_d$ and the indirect beam $U_u$ fall into the order of the bit duration (approximately $\Delta t=0.1$ to $0.7.t_{bit}$), the frequency between the minima of the distribution characteristic becomes so small that the energy of the reception signal can fluctuate virtually arbitrarily within the modulation range with the modulation rate and depending upon the radio frequency $\omega_o t$ and the depth of the minima. These energy fluctuations which are produced by the vectorial addition of the incoming signals and which are eliminated in the amplitude limiter of the receiving system prior to demodulation consist of rapid phase changes in the resultant signal which inevitably occur during the vectorial addition. Of course, it is not possible to suppress these rapid phase changes by means of the amplitude limiter and consequently they produce a bit-synchronous interference modulation at the output of the FM demodulator. The extent of this interference modulation can exceed the useful modulation by multiple integers and, thus, prevent the useful modulation from being correctly read out of the system.

The maximum phase speed of the resultant vector occurs in the minimum of the distribution characteristic and the size of the minimum determines the maximum speed of the vector. In the critical situation with selective total cancellation it can be arbitrary.

Depending upon whether the minimum is located within the deviation range which is defined by the two angular frequencies or is located outside of the two angular frequencies, two interference situations occur which exhibit characteristic differences.

(a) Minimum outside the deviation range

When the minimum lies outside the deviation range but in the vicinity of one of the two angular frequencies the reception energy will be relatively low at this angular frequency. The reception energy at the second angular frequency on the other hand must inevitably be higher since it lies closer to the next maximum. As a result of this ratio, prior to limiting the reception signal exhibits a clearly defined bitsynchronous amplitude modulation which has a polarity which is either identical to or inverted relative to the original modulation signal depending upon the position of the minimum. The limitation which normally takes place prior to the demodulation in frequency modulation, suppresses this amplitude modulation and, consequently, such modulation does not appear at the output of the demodulator. On the other hand, the phase change which occurs in the vicinity of the minimum in the event of a signal change, and which is manifest as a large signal distortion at the output of the demodulation is present at the output of the demodulation.

An extremely crictial situation of the operating behaviour is achieved when the energy undershoots the internal noise of the receiver at one of the angular frequencies. This is frequently the case when the radio sytem operates in the vicinity of the critical sensitivity or the minimum lies directly on the angular frequency and is very low which results in selective total extinction. As a result of the negative signal to noise ratio at one of the angular frequencies, instead of all of the intelligence corresponding to this angular frequency such as the zeros or ones being detected merely noise occurs at the limiter and demodulator output. The signal which has been demodulated by the FM demodulator thus becomes unuseable. However, here again the reception signal exhibits a bit-synchronous amplitude modulation prior to the limiter.

The duration of the state of noise at the demodulator output in each case corresponds to the character sequence of the modulation data flow. As during a character which lasts for longer than one bit and which has the same content (zero or one) there is no change in the receiving frequency and the same frequency arrives at the location of the receiver via all transmitting routes and, consequently, this state is retained unchanged until the next character change and this situation is referred to as "static". Signal losses which are due to this hypothetical assumption are referred to as "static extinctions" in the following description.

(b) The state at which the minimum lies at the angular frequency is defined as static extinction. This definition also applies when the extinction point lies within the deviation range but is still close to the angular frequency since the deviation alteration speed of the soft keying which is usually employed for reasons of frequency economy ($cos^2$-transition) is very low in the vicinity of the angular frequencies. However, as soon as the minimum noticeably approaches the center of the deviation range, the conditions change as follows:

(1) The phase change speed in the minimum becomes very high. The resultant instantaneous frequency displacement at the limiter and demodulator output likewise becomes very large and reaches a multiple of the useful deviation range. The duration of the displacement is dependent upon the modulation speed and the relative depth of the minimum. As this correlationship means that the duration of the displacement must always be shorter than the bit duration, the displacement within a modulation character (bit) is manifest as a peak which has a size and definition dependent upon the depth of the minimum. More than one peak can occur within one character.

However, the distortion peaks do not inevitably occur within each individual bit but only in the event of a character change as it is only in this situation that the deviation range is passed through. For this reason these distortions of the demodulated output signal are referred to as "dynamic distortions".

(2) As soon as the minimum noticeably approaches the middle frequency, the definition of the bit-synchronous amplitude modulation prior to the limiter is lost.

According to the invention, it is proposed to avoid the loss of the possibility of reading out the reception signal which occurs as a result of static extinction by employing the bit-synchronous amplitude modulation which occurs prior to the limiter in an arrangement suitable for this purpose—the static distortion corrector—and further to avoid the loss of the read-out capability which occurs as a result of the dynamic extinction by blanking the peaks in an arrangement which is suitable for this purpose—the dynamic distortion corrector—both of which are later described.

Figure 1:
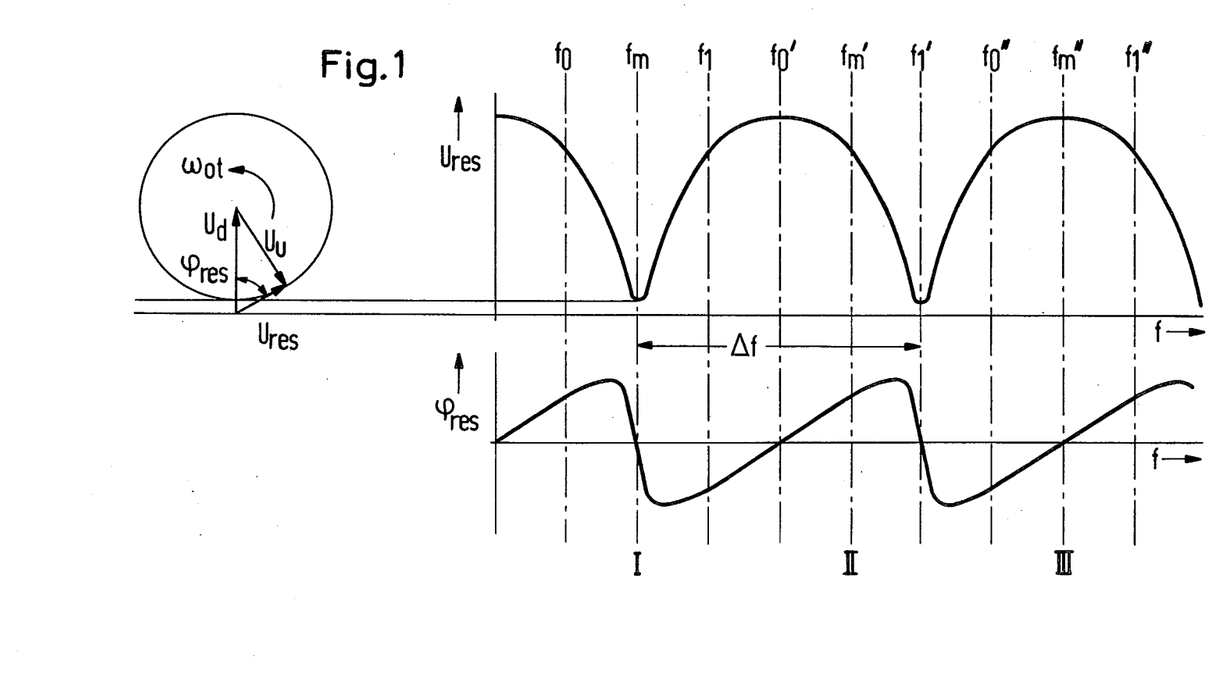
FIG. 1 is a plot of the resulting signal and the phase resulting from direct and reflected waves in a communication media.

FIG. 1 illustrates three individual clearly defined situations I, II and III. Situation I is defined as the situation where the resultant vector of the reception signal $U_{res}$ passes through a minimum at the middle radio frequency fm and is approximately equal to the two angular frequencies of the deviation $f_0$ and $f_1$. As soon as the instantaneous frequency f approaches the middle frequency fm in addition to the decrease of the resultant amplitude $U_{res}$, the associated phase rotation $\phi_{res}$ exhibits a corresponding phase jump. This relatively short phase jump occurs within the modulation spectrum an inevitably manifests itself as an instantaneous frequency displacement ($d\phi/dt$) or corresponding transit time distortions ($d\phi/df$) and indicates an interference function which is superimposed upon the original modulation function and which occurs with every digital character change. A digital character change in each case passes through the entire deviation range.

Figures 2, 2A, 2B, 2C:
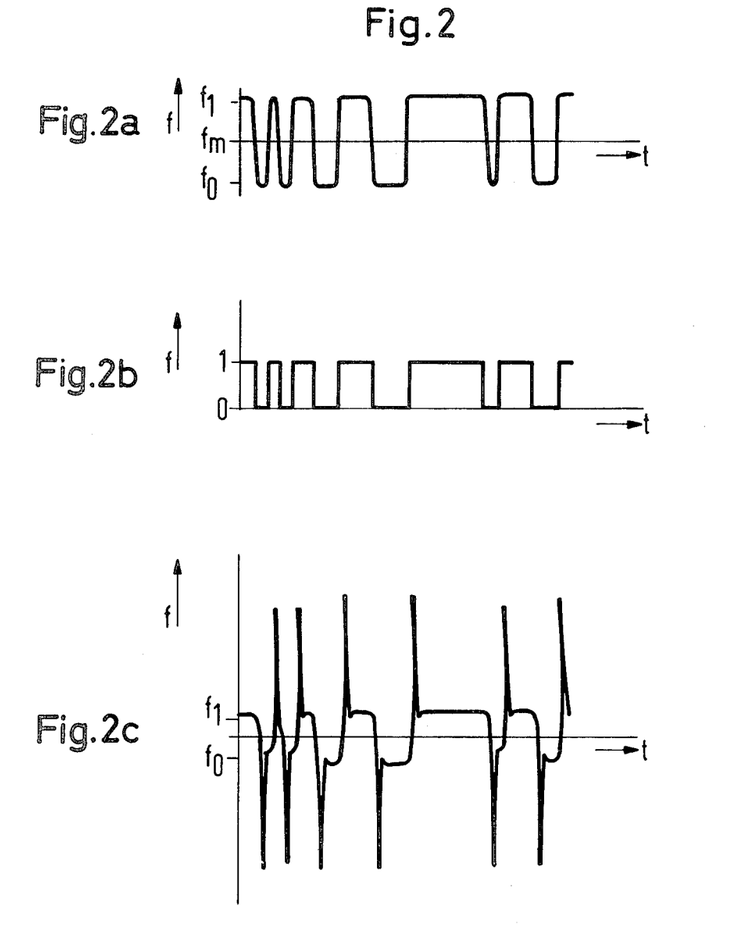
FIGS. 2a through 2c are graphs showing the comparison between the originally existing digital data flow and the interference function.

FIGS. 2a through 2c illustrate a comparison between the originally existing digital data flow (binary frequency modulation with associated data flow shown at the top in FIG. 2a) and the interference function with modulation shown in FIG. 2b which occurs on the occurrence of the interference according to situation I. It is to be observed that the deviation peaks which occur in the frequency demodulator illustrated in FIG. 2c exceed greatly the voltage values of the so-called angular frequencies $f_0$ and $f_1$ thus and the maximum deviation. However, the illustration of situation I in FIG. 1 itself shows that the information character can readily be read out particularly at the interrogation points in each case in the center of a bit.

The conditions take a serious turn if the middle frequency $f_m$ is altered and changed to the value of $f_m'$. This is a situation II illustrated in FIG. 1 which is synchronous with a low by-pass change (less than 2) compared to the situation I. Now the loss of intelligence and the amplitude minimum occur at the angular frequency of $F_1'$ and it is in this condition that the modulation function exhibits a reversal point (relatively low phase change speed) and no noticeable interference functions occur in this case. However, it is far more serious because as a result of the noticeable reduction in the reception voltage, the signal to noise ratio is decreased and in many cases becomes negative in other words undershoots the minimum reception level of the receiver. This results in an immediate loss of the possibility of reading out of the digital characters (one) and the resultant intermediate error rate at the output of the FM demodulator becomes very high.

However, in terms of amplitude the character can basically be read out because with all "zero characters" ($f_0'$ in FIG. 1) the reception level is definitely higher than at $f_m'$.

Situations I and II illustrated in FIG. 1 represent two basic types of distortion which in the following discussion relate to the situation I (extinction between the angular frequencies and consequently distortions only in the event of a character change) are designated as "dynamic extinction". Where these relate to situation II (extinction at the angular frequency and, thus, loss of the possibility of reading out one of the two digital characters which lasts until the next character change) these are referred to as "static extinction".

By its nature, static extinction can occur only when one of the two angular frequencies is located relatively close or exactly at the extinction point. On the other hand, dynamic extinction occurs as soon as the point of extinction lies between the angular frequencies $f_0$ and $f_1$. As a result, dynamic extinction and static extinction constantly merge with one another as a result of the change in the position of the spectrum minimum.

A relatively non-problematic situation occurs in multipath propagation during operation at the middle frequency $f_m$ directly at the addition point, in other words, in the situation III of FIG. 1. In this condition, neither noticeable amplitude distortions nor transit time distortions occur within the angular frequencies $f_0''$ and $f_1''$. The frequency modulated signal is practically undistorted in this case.

The conditions illustrated in FIG. 1 apply to fixed locations of transmitter and receiver and represent a frequency dependent amplitude and phase distribution. Generally, it can be noted that the conditions remain constant at one frequency for the duration of a conversation provided only fixed location reflectors and no mobile reflectors (in other words aircraft) are participating in the propagation. In the case of mobile operation, in addition to the frequency distribution of the amplitude and phase characteristics there is also a noticeable spatial distribution of these parameters on land. The spatial distribution is directly related to the wavelength of the radio frequency. Therefore, in a critical situation the distance between two minima corresponds to half of the wavelength (in other words, $f=300$ MHz $=\lambda/2=0.5$ m) and the antenna of a vehicle moving at 36 km/sec. $=10$ m/sec will accordingly pass through 20 minima per second. In order to obtain a reasonable picture of the distortion results, it is expedient in FIG. 1 to replace the frequency axis by a time axis and to displace the modulation band $f_0$ and $f_1$ illustrated in I, towards the right at such a speed that the times required to pass through an amplitude and phase wave amount to 1/20 sec. and 20 such waves are passed through at a uniform speed per second. It follows from the above results, that in moving operations the cases taken in FIG. 1 of static and dynamic extinctions (I and situation II) and also the situation III in which no FM distortion occurs merge with one another in a rapid succession corresponding to the passage of the spatial distribution and are repeated with a corresponding periodicity.

Figures 3, 3A:
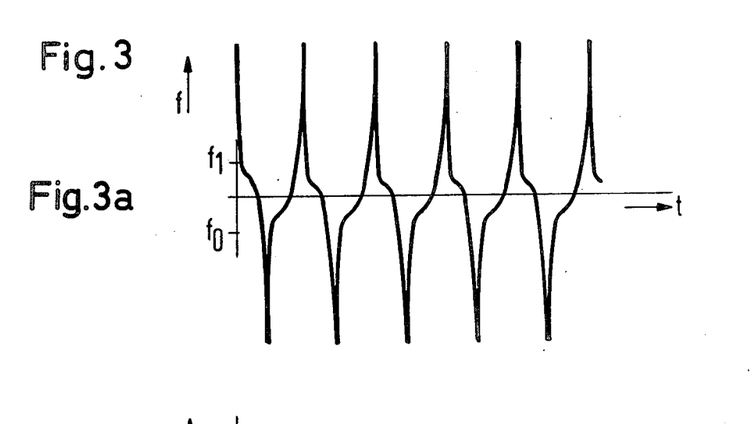
FIGS. 3a, 3b and 3c are plots of the signals at different points verses time.

A process will be described in which it is substantially assured that the digital characters can be recognized in each of the situations I, II and III. It has been assumed that a distortion correction process is to be provided which is not only economical but in particular is technically capable to instantaneously recognize and to compensate the configurations of the propagation mechanisms automatically and exclusively at the location of the equipment during the course of the normal information transmission. The advantage of such an arrangement is obvious in that as a result of the system control it is not necessary to interrupt the data flow since no test transmission is required. This dispenses with the need for measuring test transmissions at the transmitter. Therefore, the instantaneous recognition of the effects of the propagation situation can be carried out only at the receiver. FIG. 1 situation I will first be considered to explain the base-band-freqency correction facilities relating to dynamic extinction. As defined, the extinction point lies between the angular frequency $f_0$ and $f_1$. The effects of the extinction point can be seen in FIG. 3a which clearly indicates that in this case the interference function represents a frequency jump which occurs only in the event of a character change. This frequency jump occurs periodically with 0 1-sequences and considerably impedes the analysis of individual bits since it changes their energy content and, thus, produces a shift relative to longer zero or one sequences. This shift is independent of whether integrating or band limiting means are employed for further signal analysis and regeneration.

Figure 3B:
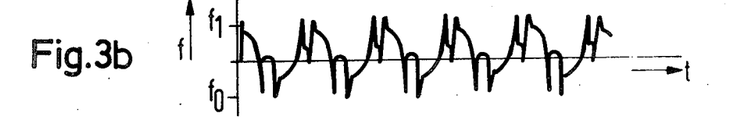
Figure 3C:
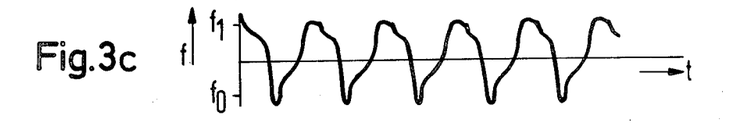
Figure 4:
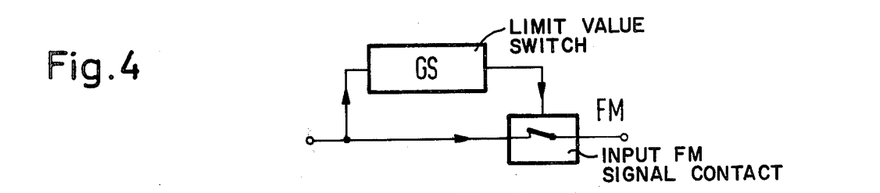
FIG. 4 is a block diagram illustrating a blanking method.
Figure 5:
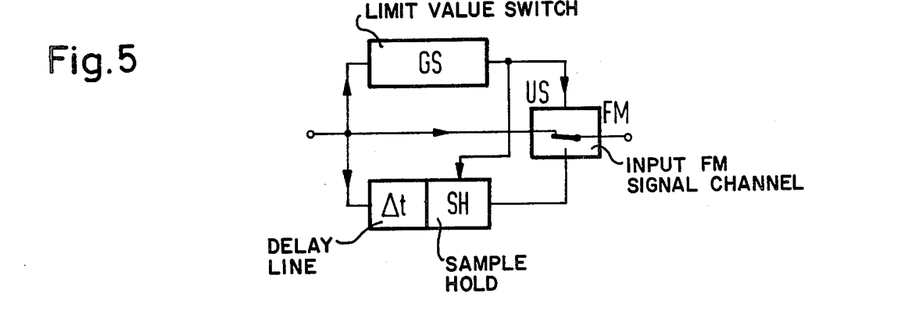
FIG. 5 is a block diagram illustrating a blanking circuit using sample hold.

In order to avoid the undesired energy components in the demodulated signal which are produced by the phase jumps it is possible to employ a blanking method such as illustrated in FIG. 4. FIG. 4 illustrates a limit value switch GS which is connected to an input FM signal contact and the limit value switch GS is actuated whenever a specific limit value such as the normal deviation range value of $f_0$ or $f_1$ is overshot. The normal frequency modulated signal is present at the input of the limit value switch and the blanked signal is present at the output. As a result of the blanking, a reduction to zero occurs where a large signal peak previously existed as illustrated in FIG. 3b. In this manner, although the peak is avoided, the energy component withdrawn from the individual bit is generally too great and does not exclude signal analysis errors. A better arrangement consists of a circuit such as illustrated in FIG. 5 wherein on the overshooting of the above mentioned peak value such value is stored in a sample hold circuit SH which is connected at the output of the limit value switch GS and for the duration of the overshooting of the limit value is substituted in the gap formed during the blanking process. As a limit value switch exhibits a low response delay, the specimen of the reception signal which is to be stored is fed through a delay line $\Delta t$ to the sample hold circuit. During this time, the change-over switch US is switched to the sample hold circuit and consequently is no longer present to receive the direct signal input. The result of this method is illustrated in the graph of FIG. 3c.

Thus, dynamic extinction correction would initially appear to be a satisfactory solution. However, this method fails in the case of static extinction (extinction of the angular frequency) since in this case no deviation range peak occurs.

Before the possibility of correcting the static extinction is discussed, the characteristics of the substitution method outside the static and dynamic extinction range will be explained. The standard situation in this respect is illustrated in situation III in FIG. 1 and it is to be noted the demodulated FM signal possesses no peaks which occur merely with dynamic extinction. Thus, the limit value switch is not actuated and in this case the unchanged directly switched through input signal is present at the output of the corrector in the substitution method.

This relatively simple arrangement itself facilitates automatic distortion correction which adapts to the corresponding instantaneous operating state in the range of the dynamic extinction and outside of the static extinction simultaneously and without time delay.

In order that dynamic extinction may be controlled it is necessary to observe the following: as soon as, during frequency modulation, extinction occurs at the angular frequency and, thus, the minimum reception level is undershot at this frequency, all distortion correcting processes based on FM distortion correction fail. Previous conclusions regarding FM distortion correction were based on the assumption that on account of the amplitude limitation prior to the frequency demodulation only the phase distortion is of interest. However, if one considers the amplitude response prior to the limiter in the case of static extinction, such as occurs in situation II, it can be seen that whenever the frequency $f_0'$ is reached, the intermediate frequency voltage reaches the maximum value whereas in the case of extinction when the frequency $f_1'$ is reached it attains the minimum value. Consequently, and obviously analyzable amplitude modulation which corresponds to the digital character sequence occurs in the intermediate signal prior to the limiter. In other words, this means that whenever static extinction occurs in accordance with the frequency modulation, the amplitude modulation of the unlimited and intermediate frequency signal is the most marked.

However, the occurrence of a correct amplitude modulation does not produce any information regarding its analysis. On the one hand, a serious difficulty consists in that the values of the intermediate frequency voltage can fluctuate by approximately 80 dB, in other words, the analyzable amplitude modulation is sufficiently high with a high IF voltage but is very low with a low IF voltage. It is in fact in the case of low intermediate frequency voltages that analysis is most desirable. This disadvantage can be overcome by providing a negatively logarithmic amplifier having a high dynamic range in a parallel arm to the frequency demodulator together with a series connected amplitude limiter. The series connected amplitude limiter is followed by a AM demodulator which has an output that emits a peak to peak voltage which corresponds to the logarithm of the degree of modulation which is independent of the absolute reception level.

Another problem exists in that with static extinction (extinction at one of the angular frequencies) two different states inevitably exist:

(a) Extinction at the angular frequency $f_0$ which corresponds to the digital zero. In this case, the amplitude modulation is in phase with the digital character sequence.

(b) Extinction at the angular frequency $f_1$ which corresonds to the digital one. Here the amplitude modulation is opposed in phase to the digital character sequence. Thus, when necessary, a suitable criteria must be made available for the correct analysis of the amplitude modulation.

If the two described analyses of the amplitude and frequency modulations are carried out at the same time, a maximum degree of speed, simplicity and economy are provided in the distortion correction for propagation disturbances. Practical measurements made on apparatus according to the present invention have completely confirmed this fact.

Figure 6:
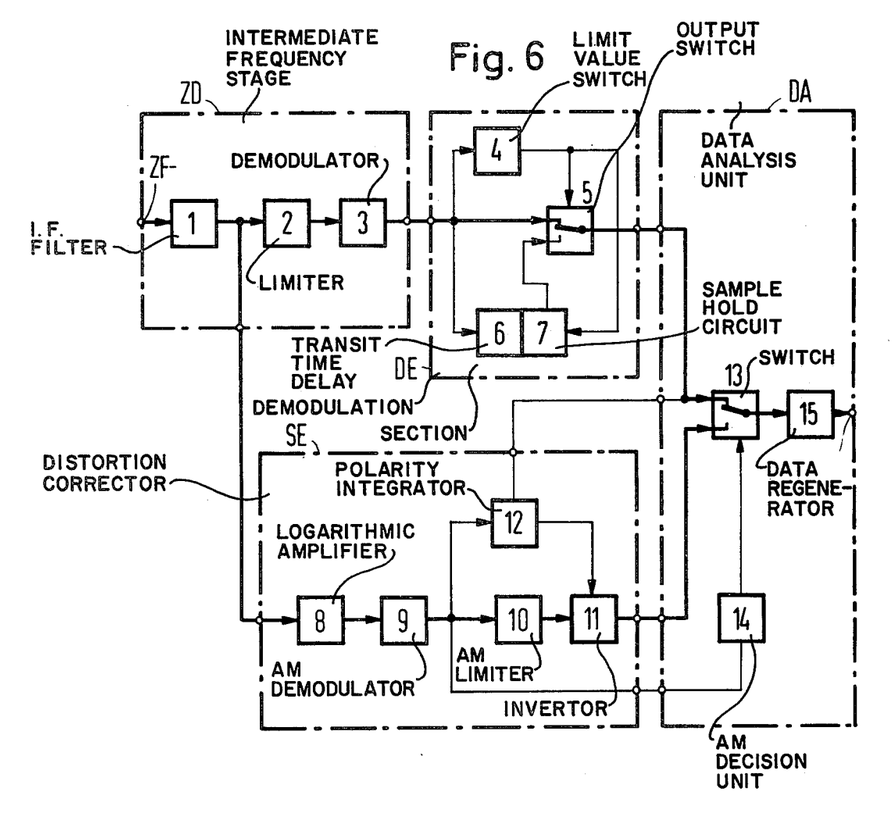
FIG. 6 is a block diagram illustrating the circuit of an overall arrangement according to the invention.

FIG. 6 is a block diagram of the overall arrangement of the invention consisting of a IF section and a demodulation section as well as a dynamic distortion corrector, the static distortion corrector and the data analysis unit.

The IF and demodulation section DE forms part of a conventional receiver and is shown only in diagram form. The IF input signal is supplied to the IF's ZD input terminal ZF and is fed to an IF filter 1. The output of the IF filter 1 is supplied to a limiter 2 and the output of the limiter 2 is supplied to a demodulator in the FM demodulator 3.

The output of the filter 1 is also supplied to the static distortion corrector SE. The output of the FM demodulator 3 is connected to the dynamic distortion corrector DE.

The dynamic distortion corrector DE has an output switch 5 which in one position is connected to the output of the FM demodulator 3 and in the case of disturbance free FM reception this output is fed directly through the switch 13 to the data regenerator 15. As soon as dynamic distortions (minimum approximately in the middle of the deviation range corresponding to the example I in FIG. 1) and the resultant peaks occur, the limit value switch 4 which is connected to the output of the FM demodulator 3 will be actuated and switches the switch 5 to the second position where it is connected to the sample hold circuit 7. The sample hold circuit 7 receives a slightly delayed demodulator signal by way of the transit time element 6 from the FM demodulator 3. At the instant at which the limit value switch 4 responds, there is applied to the sample hold circuit from the limit value switch a delay signal whose instantaneous value corresponds in a first approximation to that of the demodulated signal prior to the overshooting of the limit value. For the duration of the limit value overshoot, this instantaneous value is stored by the sample hold circuit 7 and supplied into the data flow through the switch 5. This measure assures that the energy content of the original bit is obtained and it is ensured that it can be read out in the regenerator 15.

The mode of operation of the static distortion corrector is as follows. In the event of static extinction the IF signal is output coupled from the IF filter 1 to a logarithmic amplifier 8 which supplies an input to the AM demodulator 9. The logarithmic amplifier 8 assures that the amplitude of the data signal which appears at the output of the am demodulator 9 is independent of the reception field strength. This AM output signal passes from the output of the AM demodulator through a AM limiter 10 and through an inverter 11 to second terminal of switch 13. The switch 13 initially is still in its first positioned connected to the output of switch 5. The polarity of the demodulated AM signal at the output of AM demodulator 9 and AM limiter 10 is either equal to or inverse to the demodulated FM signal at the output of switch 5, depending upon whether one or the other of the two angular frequencies as defined above have been extinguished. To provide non-ambiguous conditions in the system, that component of the demodulated FM signal which can be read out is compared with the demodulated AM signal in a polarity integrator circuit 12 which receives an input from switch 5 as well as the output of the AM demodulator 9. The output of the polarity integrator 12 is inverted if necessary in the inverter 11. The polarity integrator 12 consists of a coincidence circuit in which depending upon the relative equality or inversion of the FM/AM signals, a correspondingly integrated decision value is produced.

At this time, the function of the inverter 11 and the polarity integrator 12 will be briefly described. The phase of the AM function can be incorrect by 180° regardless of whether the angular frequency $f_1$ corresponds to the one or the angular frequency $f_0$ corresponds to the zero occurs at the extinction point.

Figure 7:
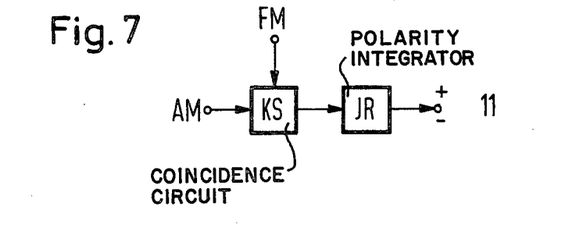
FIG. 7 is a block diagram illustrating a coincidence circuit and a polarity integrator.

The particular angular frequency occurring at the extinction point cannot provide any sensible information in the FM demodulator. The other angular frequency which does not occur at the extinction point, on the other hand, produces a completely clear statement as whenever it occurs in the digital character sequence the receiver input voltage and, thus, the instantaneous value of the AM function is high. FIG. 7 illustrates a coincidence circuit KS which receives the AM signal and the FM signal and supplies an output to the polarity integrator JR and if the coincidence circuit KS and the polarity integrator JR are keyed on at all instances of high AM voltage, a positive or negative voltage occurs as an interrogation result depending upon the polarity position of the AM signal relative to the FM signal. If the result is negative, the inverter 11 is reversed so that the AM function which is fed to the switch 13 obtains the correct polarity.

In the AM decision unit 14 which receives an input from the amplitude demodulator 9 and supplies an output to operate switch 13 and which is mounted in the data analysis unit DA the information will be automatically checked whether a serviceable bit-synchronous AM signal is received and with a certain degree of probability that no serviceable FM signal exists. If this is the case, which can be the case virtually only with static extinction, the AM decision unit 14 moves the switch 13 so that it is connected with the inverter 11 and the regenerator 15 will be fed with the data obtained from the AM section.

The IF signal which has been distorted in accordance with the relevant propagation situation and which can possess a level from −92 to −10 dBm, first passes through IF filter 1 (8–16 kHz) and then passes through a separating amplifier. With a level from in each case from −82 to 0 dBm (1 mW), it simultaneously reaches the limiter 2 and the dynamic compressor 8 and will be demodulated either in the FM demodulator 3 or the AM demodulator 9. A signal which is proportional to the corresponding useful or disturbing deviation range is available at the output of the FM demodulator 3 and a signal which is proportional to AM modulation degree is available at the output of the AM demodulator 9.

In the case of a pure FM signal with no AM signal appearing at the output of the AM demodulator 9, the AM decision unit 14 supplies the logic output signal "zero" and the FM-AM-switch 13 will remain in its initial rest position supplying FM signal.

In this manner, the FM output signal which in this case is free of disturbance from the FM demodulator 3 will pass directly through the switch 5 which is in the position shown, the FM-AM-switch 13 and through a base band filter to the regenerator 15. This signal flow corresponds to the conventional signal flow of an optimized FM receiver.

However, pure FM signals occur only rarely and particularly when one single propagation path is provided. A comparable situation occurs as already explained in the case of multipath propagation when the location of the radio frequency $f_m$ is at the maximum of the amplitude characteristic and, in other words, the situation III of FIG. 1 exists. Under this assumption FIG. 8 illustrates oscillograms of the FM data flow and of the AM function at the output of the AM detector 9.

Figure 8:
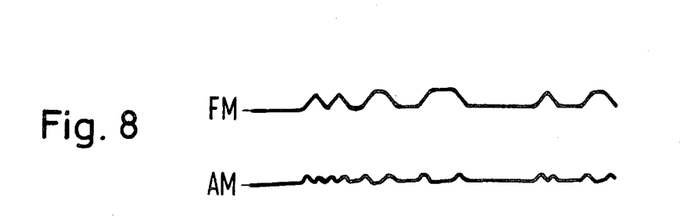
FIG. 8 illustrates an oscillogram of the FM and AM data flow.
Figure 9:
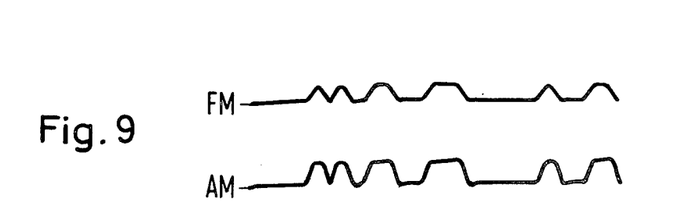
FIG. 9 illustrates sample FM and AM waves.

If the position of the spectrum is changed, in other words, due to a change in the radio frequency, this results in a corresponding change in the AM signal as in FIG. 8. In this state, however, the AM is not sufficient to actuate the AM decision unit 14 and neither would this be necessary since the FM signal can still be satisfactorily read out as indicated in FIG. 9.

Figure 10:
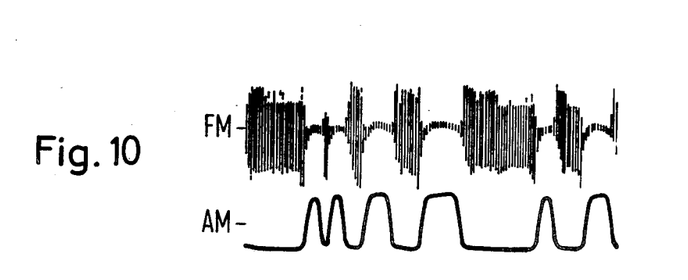
FIG. 10 illustrates sample FM and AM waves.

If the spectrum is displaced further toward the zero point, as illustrated in FIG. 10, so that an angular frequency actually reaches the minimum the FM can no longer be read out due to static extinction while the AM signal is now completely formed. The AM decision unit 14 will have detected this and would have changed the FM-AM-switch 13 to the AM switch where it is connected to the output of the inverter 11. The AM signal present at the output of the AM demodulator 9 is gated into the signal path through the AM limiter and the inverter 11 and switch 13 with an amplitude corresponding to the FM signal.

Figure 11:
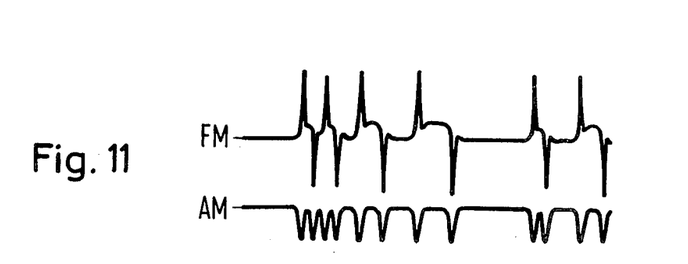
FIG. 11 illustrates sample FM and AM waves.

If a spectrum is now further displaced so that symmetry is achieved between the angular frequencies around the distinction point as illustrated in FIG. 11, the AM signal disappears again and the FM signal exhibits an interference function since this is a dynamic extinction.

The AM decision unit 14 will now reset the switch 13 to its starting position to connect it to the output of switch 5. The interference function prevailing at the output of the FM demodulator overshoots the limit values established by switch 4 which in the sample hold circuit 7 leads the instantaneous value which is to be substituted from the delay line to the substitution switch 5 which is simultaneously switched to the down position to receive the output of the sample hold circuit 7 for the duration of the overshoot and, thus, substitutes the stored analogue value from the sample hold circuit as the output to switch 13.

This allows the regenerator 15 to receive an interference free function signal at the output of the base band limiting filter for all situations discussed above.

The above described arrangement is able to automatically recognize and compensate for all errors with a transit time displacement of $\Delta t = \frac{1}{2}$ bits on the by-pass and with a maximum extinction depth of 22 dB.

If short noise or impulse disturbances occur additionally during the FM analysis, these likewise become manifest as short peaks in the modulation text. The dynamic distortion corrector automatically recognizes and eliminates such peaks and, thus, functions as an interference blanking device.

Figure 12:
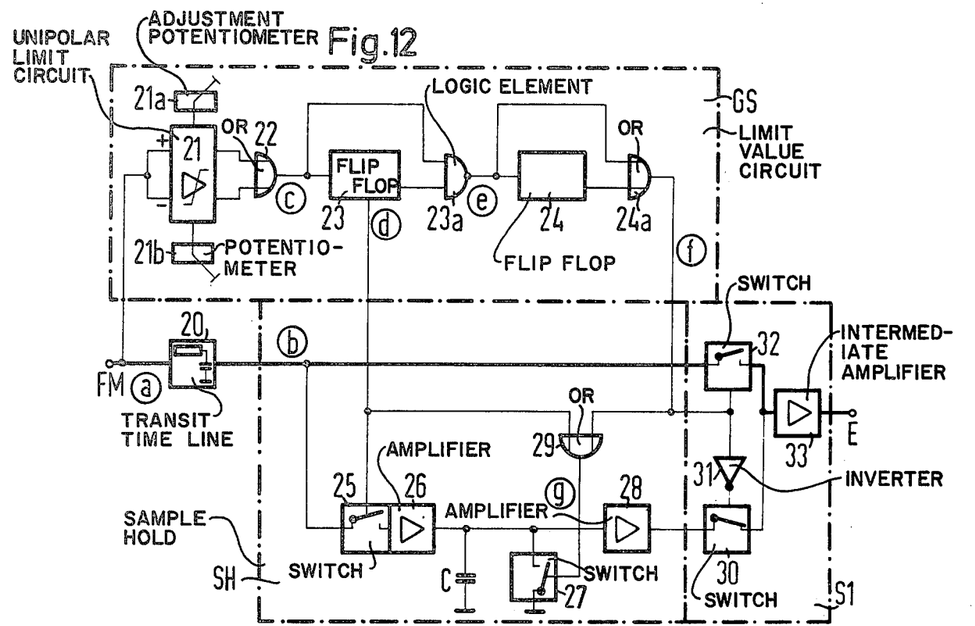
FIG. 12 is a electrical diagram illustrating a distortion corrector.
Figure 13:
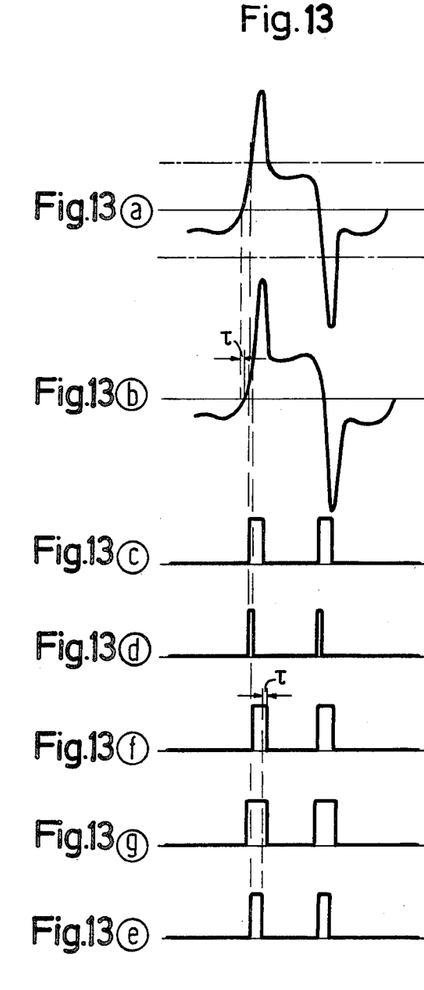
FIGS. 13a through 13g illustrate wave forms in different portions of the circuitry.

FIG. 12 illustrates a sample embodiment of the distortion corrector illustrated in FIG. 6. Terminal designated FMa represents the output of the FM demodulator 3 in FIG. 6 and is applied through a transit time line 20 to switch 25 which is controlled by a monostable flip-flop 23. The points circled in FIG. 12 correspond to equivalent points in the circuit of FIG. 6. The FM signal is also applied from terminal FMa to a unipolar limit circuit 21 in the limit value switch GS. The limit circuit is formed with a double voltage comparator circuit which has a positive threshold that can be varied by means of an adjustment potentiometer 21a connected to the unipolar limit circuit 21 as shown. The negative threshold can be varied by means of a potentiometer 21b connected to the limit circuit 21. The operating or trigger thresholds of the limiter 21 can be adjusted with the potentiometers 21a and 21b such that the limiter 21 responds to either positive and negative change caused by multipath distortion or noise which exceeds the useful frequency swing as discussed above. As long as this threshold is being exceeded the voltage comparator 21 produces an output signal which is connected to monostable flip-flop 23 through OR circuit 22. This output is also supplied to the combinational logic element 23a. The actuating signal, in other words, the output signal of the OR gate 22 illustrated in line c of FIG. 13 produces a rectangular or square pulse for the period during which the negative or positive threshold is exceeded. Monostable flip-flop 23 is adjusted such that it supplies a narrow control signal on line d in FIG. 13 coinciding with the leading or ascending edge of the signal to switch 25 contained in the sample hold circuit block 6 of FIG. 6. In this manner, the switch receives a test sample of the output signal from the FM demodulator and the output signal which is supplied and occurs at point b in FIG. 13 is time delayed by the transit time element or delay line 20. Capacitor C is charged to the value of the test sample through amplifier 26.

The delay time $\tau$ of the transit time or delay line 20 is small as compared with the bit time length, however, it is timed such that a test sample is taken from a signal at point b shortly prior to the signal exceeding the threshold and the test sample at its maximum value corresponds to the amplitude value of the respective non-distorted character information or data.

A monostable flip-flop 24 is triggered with the negative edge of the signal out of the combinational logic element 23a and extends the substitution period by $\tau$ through OR gate 24a. The output signal of 24a switches a switch 32 which is closed during undistorted operation. In this instance the readily readable FM signal passes to an intermediate amplifier 33 and is supplied to the output terminal E. As indicated in the block circuit diagram of FIG. 6, the FM-AM change-over switch indicated by 13 receives the output from terminal E. The output of OR gate 24a switches a switch 30 through inverter 31 and the switch 30 is open in a non-distorted operation. If, however, due to instances wherein the frequency swing is exceeded a pulse occurs at the output of the OR gate 24a as shown by plot e in FIG. 13 it closes the gate 30 and opens the gate 32. The substitution time which has been shortened by the duration of the test sample is virtually extended by monostable flip-flop 24 by the delay time $\tau$ of the delay line 20. The output side of the switches 32 and 30 are integrated into the block S1. It is to be realized that the circled letters illustrated in FIG. 12 correspond to the waveforms existing at such points in FIGS. 13a through 13e.

Connected in parallel with the capacitor C is a switch 27 which is controlled by the pulse of the OR gate 29 such that it opens during the time of the pulse and, thus, does not change the charge state of the capacitor. During sampling the OR gate 29 receives an enabling pulse from the monostable flip-flop 23 and during the hold phase from OR gate 24a. This results that for the time subsequent to the pulse being received on line g the control signal of switch 27, the charge stored in capacitor C can reach the FM output through the amplifier 28 and through the switch 30. During the remaining time, capacitor C is short-circuited by the closed switch 27 and it will be discharged. In this manner it is assured that uncontrolled charges of capacitor C cannot reach switch 30 and from there reach the output. Switch 30 is controlled by the signal on line f and it switches and connects the substitution value to the output only when the sample phase has been terminated.

Figure 14:
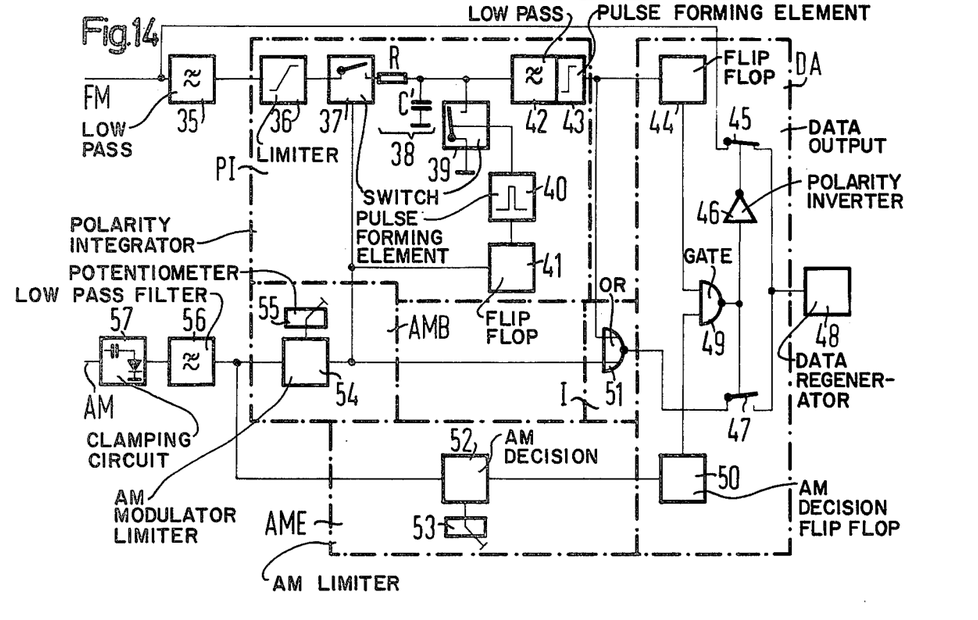
FIG. 14 is a block diagram of a static distortion corrector.

FIG. 14 illustrates a circuit for the distortion corrector which correspond to the following elements of FIG. 6. PI is the polarity integrator, DA is the circuit for the data output, I is the polarity inverter designated in the block diagram of FIG. 6 by 11, AME is the AM limiter. Elements 52 and 50 constitute the AM decision unit 14 illustrated in the block diagram of FIG. 6.

In connection with the block circuit diagram, it was shown that the IF signal first passes through a logarithmic amplifier of a known type and is subsequently demodulated in a AM demodulator. The output signal of this demodulator is designated by AM and is initially supplied to a clamping circuit 57. The clamping circuit 57 serves the purpose of separating or cutting off the mean DC value voltage which is determined by the field intensity of the received signal. In the simplest case, as indicated in the circuit it consists of a series capacitor and a clamping diode in the parallel branch. The signal is subsequently supplied to a low pass filter 56 which has a limit frequency which lies approximately at the highest modulation frequency. From the filter 56 the signal first is supplied to an AM modulator limiter 54 which has a threshold that is adjustable by means of a potentiometer 55. The potentiometer 55 is adjusted such that in the case of pure FM conditions such as illustrated by cases I and II in FIG. 1, the AM ripple resulting during multipath reception as a consequence of the amplitude characteristic cannot activate the AM analysis. The limiter 54 is constructed as a comparator and limits the AM signals and in this manner they are converted into digital information. The signal in the form of AM data flow then reaches the polarity integrator PI and the AM inverter I.

As stated previously in the case of an analyzable AM data flow, the IF level of one of the two limits are cut off frequencies which is necessarily higher by a certain amount than in the case of the other limit or cut off frequency. Accordingly, the character polarity of the higher IF level must also be detectable after the FM demodulator. Only this signal ensures a reliable determination regarding the polarity of the character, in other words, a logical zero or a logical one. Depending upon which of the two limit or cut off frequencies exist, the extinguishing or blanking operation takes place and the polarity allocation between the AM signal and the FM data flow can be in a first position or in an inverse position. Thus, for comparison purposes, the polarity integrator in addition to being supplied with the AM signal from the limiter 54 is also supplied with a FM signal which is designated by FM through low-pass filter 35. The FM signal is removed from the output E of the dynamic distortion corrector according to the FIG. 12. Low pass filter 35 has a limit frequency which corresponds approximately to the highest modulation frequency. Immediately following its output, there is a limiter 36. A switch 37 receives the output of limiter 36 and in the closed state of this switch, the FM signal reaches a circuit 38 comprising a resistor R and a capacitor C'. Switch 37 is controlled by the AM data flow coming from the comparator 54. Thus, switch 37 is only closed when the AM signal is of such a magnitude that threshold 55 is exceeded. In other words, during the non-distorted limit or cut-off frequency capacitor C' in element 38 is charged and keeps this charged even during the distorted limit or cut-off frequency. Connected in parallel with capacitor C' of circuit 38 is a switch 39. This switch is controlled with a pulse forming element 40 and a monostable flip-flop circuit 41. From the leading or ascending edge of the AM data signal, the monostable flip-flop 41 produces a pulse which is very short in comparison with the bit duration. During this pulse, capacitor C' in element 38 will be entirely discharged. Connected to the output side of switch 39 there is a low pass filter 42 and a pulse forming element 43. The low pass filter is designed to suppress the discharge switching or connecting peaks so as to assure that the required clear polarity statement at the output of pulse forming element 43 is made.

Figure 15:
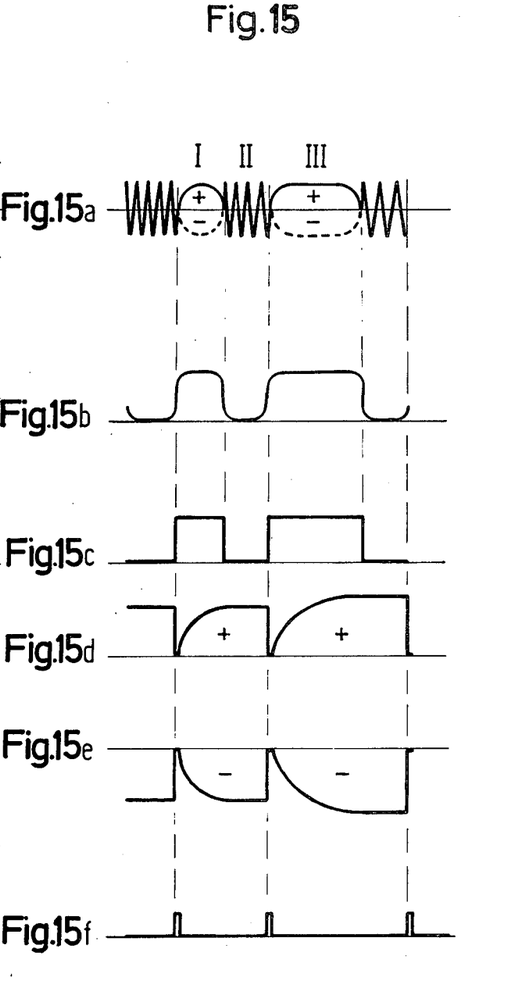
FIGS. 15a through 15f illustrate waveforms occurring in different portions of the circuitry.

FIG. 15 comprises waveforms occurring in the circuit at different points. Plot a of FIG. 15 illustrates a distorted FM signal which in time span I which corresponds to one bit has clear information statement and which during time span II again for one bit becomes illegible. During time span I the discriminator output voltage can be positive or negative depending upon the character polarity (logic 1 or logic 0). The latter negative voltage is indicated in the case of minus by the broken line in FIG. 15a. During the following time span III corresponds to several bits, the signal can again be either positive or negative; however, it is legible subsequent to the frequency demodulator. In FIG. 15b, the respective AM data signal of the AM demodulator is illustrated which appears in the form of a digital output signal illustrated in FIG. 15c at the output of the comparator 54. This signal controls the monostable flip-flop 41 and switch 37. In FIG. 15d, the voltage across the capacitor C' is illustrated and for the instance in which a positive polarity of the FM signal was present. In FIG. 15e, the same is illustrated for a negative polarization voltage applied to capacitor C'. Due to the initial condition, with a zero charge, the capacitor charge must be short-circuited by switch 39 for a short time, t, much less than one bit, during the increase or rise of the AM signal by the monostable flip-flop 41. This is indicated by the signal corresponding to FIG. 15f. Thus, depending upon the polarity equilibrium or the polarity reversal from AM to FM data there appears at the output of pulse forming element 43 a clear digital place or digital information which after passing through polarity inverter 51 inserts the now analyzable AM data flow from comparator 54 into the FM data flow corresponding to the character polarity direction.

In the simplest instance, the polarity inverter I consists of an exclusive OR gate as illustrated. In this manner, it is assured that the input delivered by comparator 54 always appears in an equilibrium or balance with a FM data at the output of inverter 51. This signal is then supplied through switch 47 to the actual data output, in other words tha data regenerator 48. In order to assure that the AM analysis is completed, only when there is sufficient signal to noise ratio and only when there is a reliable information output of the AM limiter and the polarity integrator, two subsequently triggerable monostable flip-flops 44 and 50 are provided. Monostable flip-flop 44 is controlled by the output of pulse formation element 43 and triggers the AM switch if reliable information from the polarity integrator has been present for a certain period of time. On the other hand, monostable flip-flop 50 is provided which is actuated by way of the AM decision unit AME. The AME unit consists of a comparator 52 with a threshold which is adjustable with a potentiometer 53 and is actuated by the AM output of the low pass filter 56. The same considerations here apply as in the case of potentiometer 55 of comparator 54. If the AM signal present at decision unit 52 has exceeded the threshold for a certain time span which is substantially greater than the bit duration monostable flip-flop then will trigger the AM analysis operation.

The actual change-over switch between the AM and FM consists of switching paths 45 and 47 and polarity inverter 46 and is switched over to the AM analysis only if both clear AM information occurs and the monostable flip-flops 44 and 50 are portions of the combinational logic element consisting of gate 49. The time constant of the monostable flip-flops 50 and 44, respectively, essentially depend upon the speed of change of the propagation medium and upon the related automatic switchover speed of the analysis conditions. The time constant will be selected for this phase of operation.

Although the invention has been described with respect to preferred embodiments it is not to be so limited as changes and modifications may be made which are within the full intended scope as defined by the appended claims.

We claim as our invention:

1. A system for the reception of FSK data signals, through a propagation medium that may have reflection paths and particular for reception at mobile stations of long-distance traffic and scatter beam traffic, wherein information losses caused by phase and amplitude distortions are automatically detected in two mutually supplementary arrangements one of which comprises a frequency discriminator (3) receiving the input data signals and a dynamic distortion corrector (DE) receiving the output of said discriminator (3) for recognizing and suppressing interference peaks caused by reflection distortions, said dynamic distortion corrector comprising a limit value device (4), a compensating circuit (6, 7) and a first output switch (5) controlled by the limit value device (4) and which substitutes said suppressed interference peaks at given signal amplitudes through switching the output of said dynamic distortion corrector from the output of said frequency discriminator (3) to the output of said compensating circuit (6, 7) which supplies to said first output switch (5) either the output of said FM discriminator (3) or the output of said compensating circuit (6, 7), and the other arrangement comprising a static distortion corrector (SE) which includes an AM demodulator (1), a polarization inverter (11) and a polarity integrator circuit (12), said polarity integrator circuit (12) receiving outputs from said AM demodulator (9) and said first output switch, said inverter receiving said AM demodulator output and an output from said polarity integrator (12) and produces a corrected signal indicative of the incoming FSK signals, a second output switch responsive to the output of said first output switch or the output of said polarization inverter, and an AM decision unit (14) responsive to the output of said AM demodulator to select one of the outputs of said first output switch or said polarization inverter for application to an output signal line.

2. A system for the reception of digital communication information as claimed in claim 1 including a common IF path, a limiter (2) supplying signals to the FM demodulator (3) and a dynamics compressor (8) supplying an input to the AM demodulator (9).

3. A system for the reception of digital communication information as claimed in claim 2 characterized in that said dynamics compressor (8) is designed as an amplifier having negatively logarithmic amplitude characteristics.

4. A system for the reception of digital communication information as claimed in claim 3, characterized in that said compensation circuit includes a delay line (6) which is connected to the output of said FM demodulator (3).

5. A system for the reception of digital communication information as claimed in claim 4 characterized in that an AM limiter (10) is connected between said AM demodulator (9) and said polarization inverter (11).

6. A system according to claim 1 characterized in that said dynamic distortion corrector consists of a double-voltage comparator (21) which has positive and negative thresholds which can be adjusted to reference levels and which receives the input signal, an OR gate (22) connected to the output of said comparator (21) a pulsing circuit (23) connected to said OR gate (22), a capacitor (C), a transit time delay line (20), a third switch (25) connected to said pulsing circuit (23) such that when the input signal exceeds said thresholds, switch (25) is closed briefly to transfer the instantaneous value of the input signal which has been delayed by a small time delay period by said transit time line (20) to said capacitor (C) and the charge of said capacitor (C) is maintained until said input signal falls below the threshold, a first change-over switch (30) connected to said capacitor (C) to provide an output (E), and circuit elements (23a, 24, 24a and 29) which, upon the closing of said switch (25), opens a short-circuit switch (27) in parallel with said capacitor (C), closes said first change-over switch (30), and opens a second change-over switch (32) which normally connects the delayed input signal to the output (E) for a period until the input signal no longer exceeds said threshold.

7. A system according to claim 6, characterized in that the output signal of said AM demodulator (9) is supplied to a clamping circuit (57) a low pass filter (56) receiving the output of said clamping circuit (57), an AM limiter (54) receiving the output of said low pass filter (56), the output signal of said AM limiter supplied to one input of said polarity inverter which comprises an exclusive OR gate (51), the output of said AM limiter being also supplied to a fourth switch (37) when the AM signal exceeds a certain level, said fourth switch (37) being closed thereby and connecting the FM signal to a second capacitor (C') and said second capacitor (C') produces a signal, a second low pass filter (42) connected to said second lowpass filter (42), a first pulse forming element (43) connected to the output of said second capacitor (C'), the output of said first pulse forming element (43) connected to the other input of said exclusive OR gate (51), a second pulse forming circuit (41, 40) receiving the output signal of said AM limiter (54), and from the leading ascending edges of this signal forming a pulse which is very short, a fifth switch (39) receiving said pulse from said pulse forming circuit (41, 40) to close it to discharge said second capacitor (C'), another switch (47) connected to the output signal of said exclusive OR gate (51), said another switch (47) being closed when there is a legible AM signal, and a data regenerator (48) connected to the output of said another switch (47).

8. A system according to claim 7, characterized in that a triggerable monostable flip-flop (44) is connected to the output of said first pulse forming element (43), a second logic gate (49) receiving the output of said monostable flip-flop (44), an AM decision circuit (52) receiving the AM signal at the output of said low pass filter (56), a triggerable monostable flip-flop (50) receiving the output of said AM decision circuit (52) and supplying its output to the other input of said second logic gate (49), and the output of said second logic gate (49) connected to said another switch (47) to close it, yet an additional switch (45) connected to receive the input FM signal and controlled by said second logic gate (49) in the case of legible FM signal data to be closed, and simultaneously open said another switch (47) to connect the FM signal to the input of the data-regenerator (48).

* * * * *